United States Patent [19]
Chen

[11] Patent Number: 5,459,752
[45] Date of Patent: Oct. 17, 1995

[54] SIMPLE DIGITAL METHOD FOR CONTROLLING DIGITAL SIGNALS TO ACHIEVE SYNCHRONIZATION

[75] Inventor: Daniel Chen, Taipei, Taiwan

[73] Assignee: Umax Data System Inc., Hsinchu, Taiwan

[21] Appl. No.: 153,749

[22] Filed: Nov. 17, 1993

[51] Int. Cl.$^6$ .................................................. H04L 7/00
[52] U.S. Cl. .................... 375/354; 375/375; 370/105; 327/142; 327/155; 327/163; 327/141
[58] Field of Search ..................................... 375/106, 107, 375/108, 118, 119, 120, 354–357, 373–375, 376; 307/260, 269, 527, 528; 328/63, 74; 370/105; 327/141, 142, 144, 146, 162

[56] References Cited

U.S. PATENT DOCUMENTS

| | | | |
|---|---|---|---|
| 4,613,979 | 9/1986 | Kent | 375/108 |
| 4,807,258 | 2/1989 | Seiber et al. | 375/108 |
| 4,876,701 | 10/1989 | Sanner | 375/106 |
| 5,249,206 | 9/1993 | Appelbaum et al. | 375/107 |
| 5,307,381 | 4/1994 | Ahuja | 375/107 |

*Primary Examiner*—Stephen Chin
*Assistant Examiner*—Amanda T. Le
*Attorney, Agent, or Firm*—W. Wayne Liauh

[57] ABSTRACT

A simple digital method is disclosed for controlling the digital signals sent out from a pluralities of identical signal processors (i.e, signal generators) so as to achieve synchronization. The method comprises the steps of: (a) obtaining a gate array logic circuit containing a plurality of pairs of comparison terminals and reference terminals, each of the comparison terminals is connected to a respective signal processor and the reference terminals are respectively connected to at least two different signal processors; (b) performing a gate array logic circuit operation, which comprises the following sub-steps: (i) performing a waiting procedure for each pair of comparison terminal and reference terminal until it is received that the comparison terminal is "1" and the reference terminal is "0", then moving to a gate procedure; otherwise, continuing the waiting procedure (i.e., no disable signal is sent out); (ii) performing a gate procedure by continuously sending out a "1" gate signal, i.e., the gate being set at "1" state (i.e., disable signal), until a "1" signal is received at the reference terminal is "1", then moving to a reset procedure; (c) performing a reset procedure by sending out a "0" gate output, i.e., the output gate being set at "0" state, the reset procedures continues until the reference terminal is "0", then going back to said waiting procedure; wherein a "0" gate signal indicating that system synchronization is normal, thus no disable action is taken, and a "1" gate signal indicating that one of the signal generators connected to a specific comparison reference is too fast and a disable action is taken. No disable action is taken during either the "waiting" or the "resetting" procedure; however, only the waiting procedure can be switched to the gate procedure (i.e., a disable action being taken).

4 Claims, 5 Drawing Sheets

SIMPLE DIGITAL METHOD FOR CONTROLLING DIGITAL SIGNALS TO ACHIEVE SYNCHRONIZATION

BACKGROUND OF THE INVENTION

In a digital computer system, several identical digital signal generators are usually used for generating synchronous and identical signals; the conventional method is to use a clock source as a common input for all such signal generators (as shown in FIG. 1), and each of them is to be counted for generating a synchronous signal. However, each signal generator has its particular characteristics, i.e., when each signal generator starts to count, the time required to count might have more or less of a difference of about 1–3 clock signals; further, as soon as the frequency of the clock source is higher, such difference will also be greater. Moreover, when the voltage level of the clock is unstable, a non-synchronization might take place. Therefore, an automatic correction means has to be provided, otherwise, the stability of the whole system would be reduced considerably.

SUMMARY OF THE INVENTION

This invention relates to a simple digital method for controlling digital signals to achieve synchronization. Such method is deemed a novel method in controlling the synchronous signals of a plurality of identical digital signal generators. The prime feature of the present invention is that all the synchronous signals generated through all signal generators will be compared with each other through a gate array logic circuit. In case of a non-synchronization taking place, the input clock from a faster signal generator will be disabled so as to achieve a synchronization again automatically.

Moreover, the prime object of the present invention is to provide a control method for the synchronous signals from a plurality of identical signal generators by comparing two synchronous signals which were generated by the signal generators. As soon as a non-synchronization is detected with a gate array logic circuit, the input clock of the faster signal generator will be disabled for a time so as to allow the system to return to a normal synchronous condition automatically.

DETAILED DESCRIPTION

Figure 1:
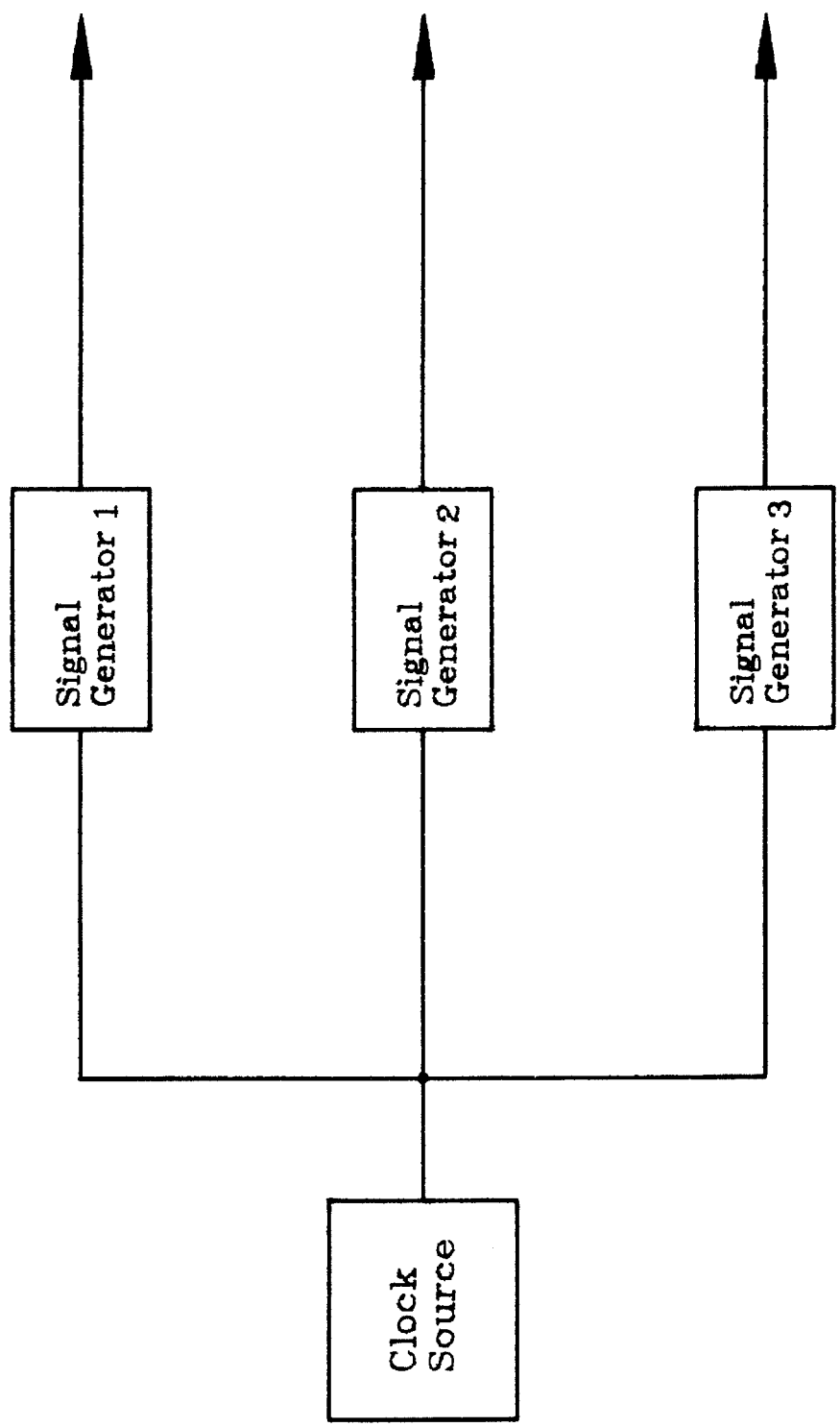
FIG. 1 is a diagram, illustrating a conventional multi-signal generator.
Figure 2:
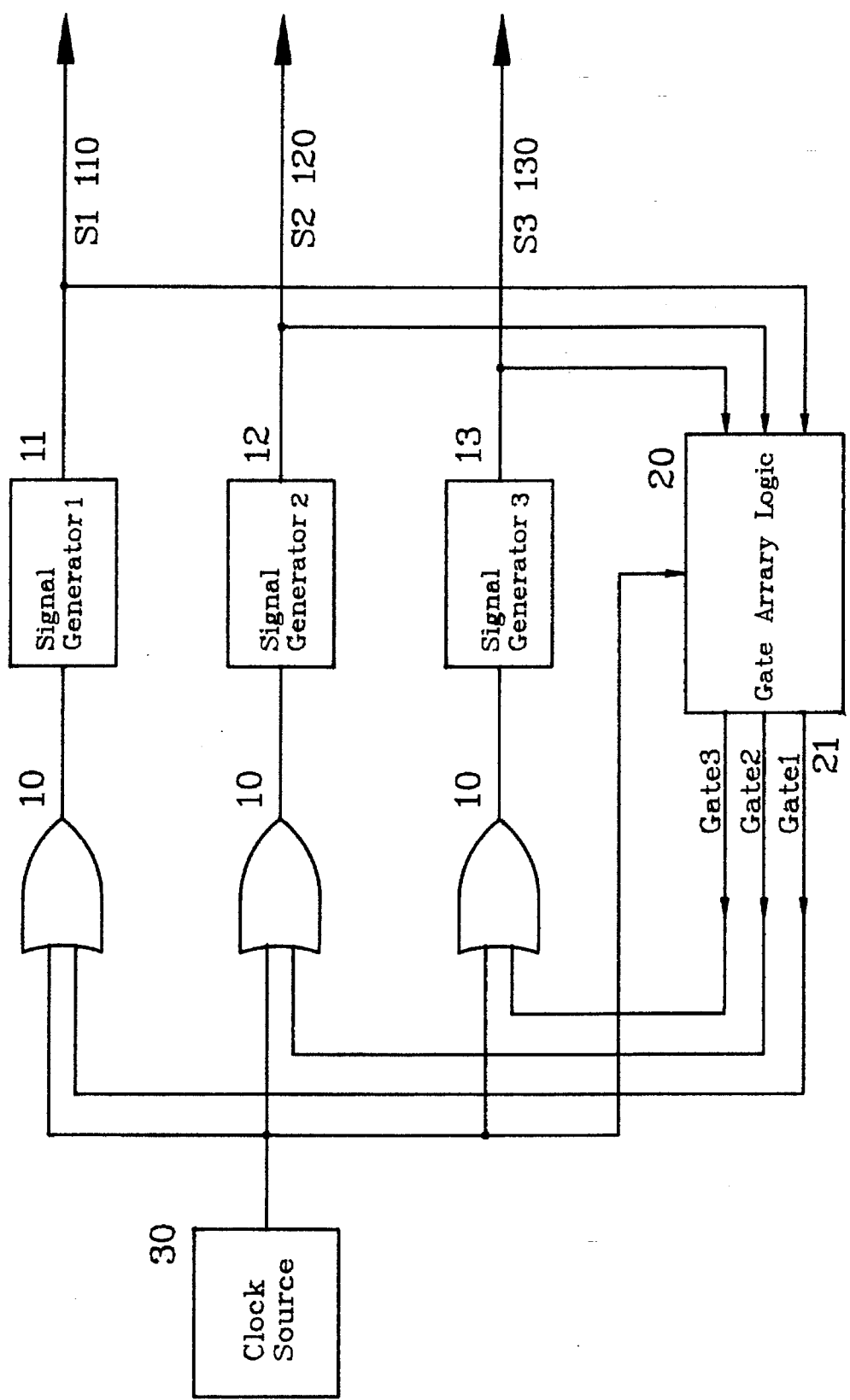
FIG. 2 is a diagram, illustrating a digital method for controlling digital signals to achieve synchronization according to the present invention.

Referring to FIG. 2, the present invention is illustrated with an embodiment of a digital method for controlling digital signals to achieve synchronization (using three digital signal generators as an example); the output signals of the three identical signal generators (SG1, SG2, and SG3) 11, 12 and 13 are used as the input signals of a gate array logic circuit 20; another clock source 30 is used as the time base of sampling for the gate array logic circuit 20 to detect non-synchronization. In the event of a non-synchronization taking place, the gate array logic circuit 20 will have the gate output of the faster signal generators set at "1" (when the system synchronization is normal, no action to disable is taken, and all gates are set at "0"), which will pass through an OR-gate 10 and applied to the input clock signal of a signal as a temporary shut down generator.

Figure 3:
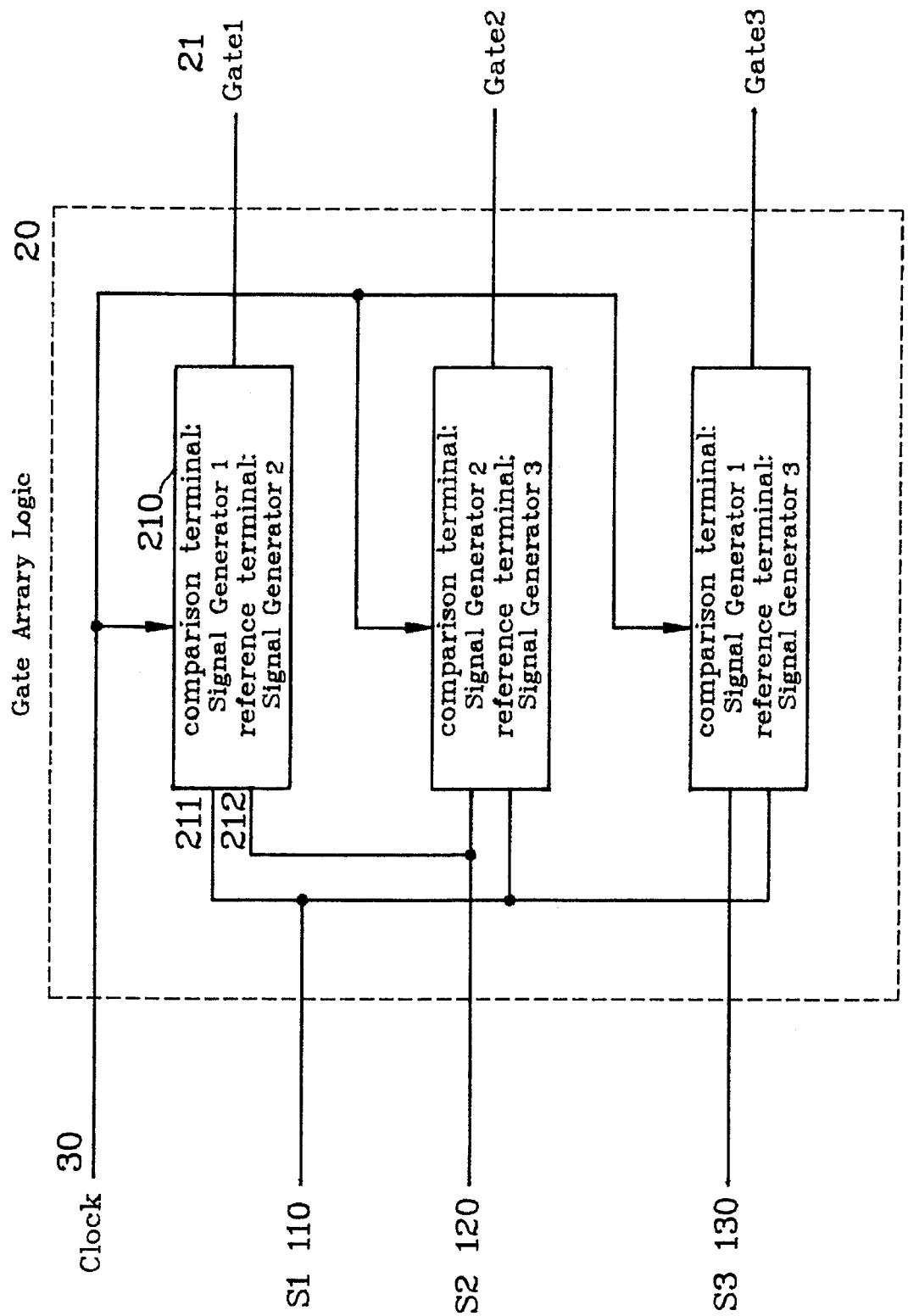
FIG. 3 is a gate array logic circuit according to the present invention.

In a gate array logic circuit (as shown in FIG. 3), a clock source 30 is used as a positive-edged-triggering sequential circuit. The output of every signal generator is used as an input to match each other. For example, the output signal S1 110 of the signal generator SG1 11 (as shown in FIG. 2) is used as an input 211 of the comparison terminal of the control circuit gate 1 210, while the output signal S2 of another signal generator SG2 12 (as shown in FIG. 2) is used as the reference terminal input 212, the control circuit gate 1, shown as numeral 210. When the comparison terminal input 211 is "1", and the reference terminal input 212 is "0", a non-synchronization has taken place. When this occurs, Signal Generator SG 1, shown as numeral 11, is faster, and the gate 1, shown as numeral 210, will set the output gate of gate 1, shown as numeral 21, at "1" so as to disable the SG1 11 until the reference terminal input 212 turns to "1", and then the the output gate 21 of gate 1 will be set at "0" again.

Figure 4:
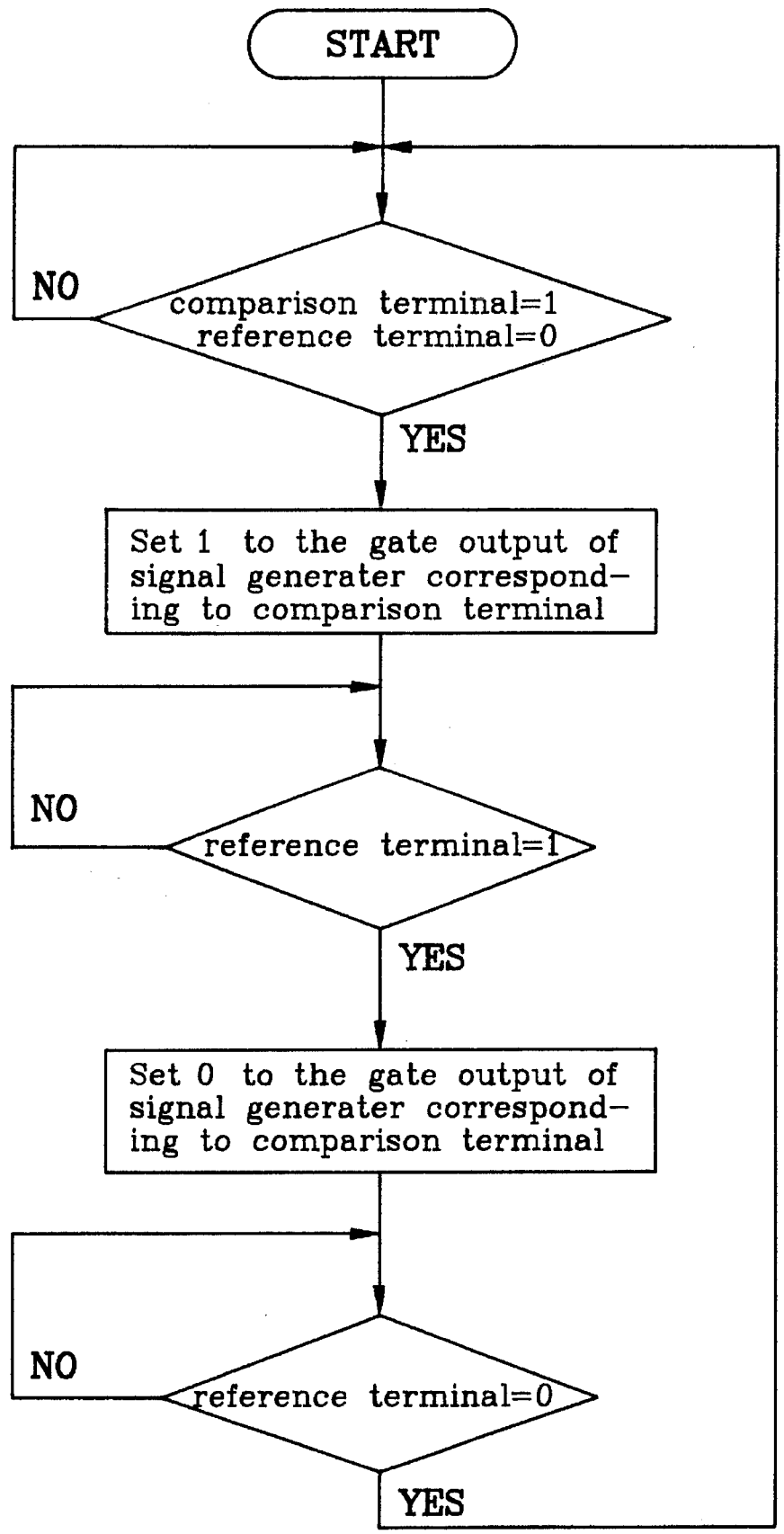
FIG. 4 is a control flow chart for a control circuit in a gate array logic circuit according to the present invention.

FIG. 4 is a flow chart, showing the control procedures in a control circuit of the gate array logic circuit:

(A). Waiting procedure: If the comparison terminal is "1" and the reference terminal is "0" the control will enter the gate procedure; otherwise, the waiting procedure will remain unchanged.

(B). Gate procedure: The corresponding gate of the comparison terminal is set in "1" state; if the reference terminal is "1", the reset procedure will start; otherwise, the gate procedure will continue without change.

(C). Reset procedure: The corresponding gate of the comparison terminal is set in "0" state; if the reference terminal is "0", the waiting procedure will appear again; otherwise, the reset procedure will continue without change.

Figure 5:
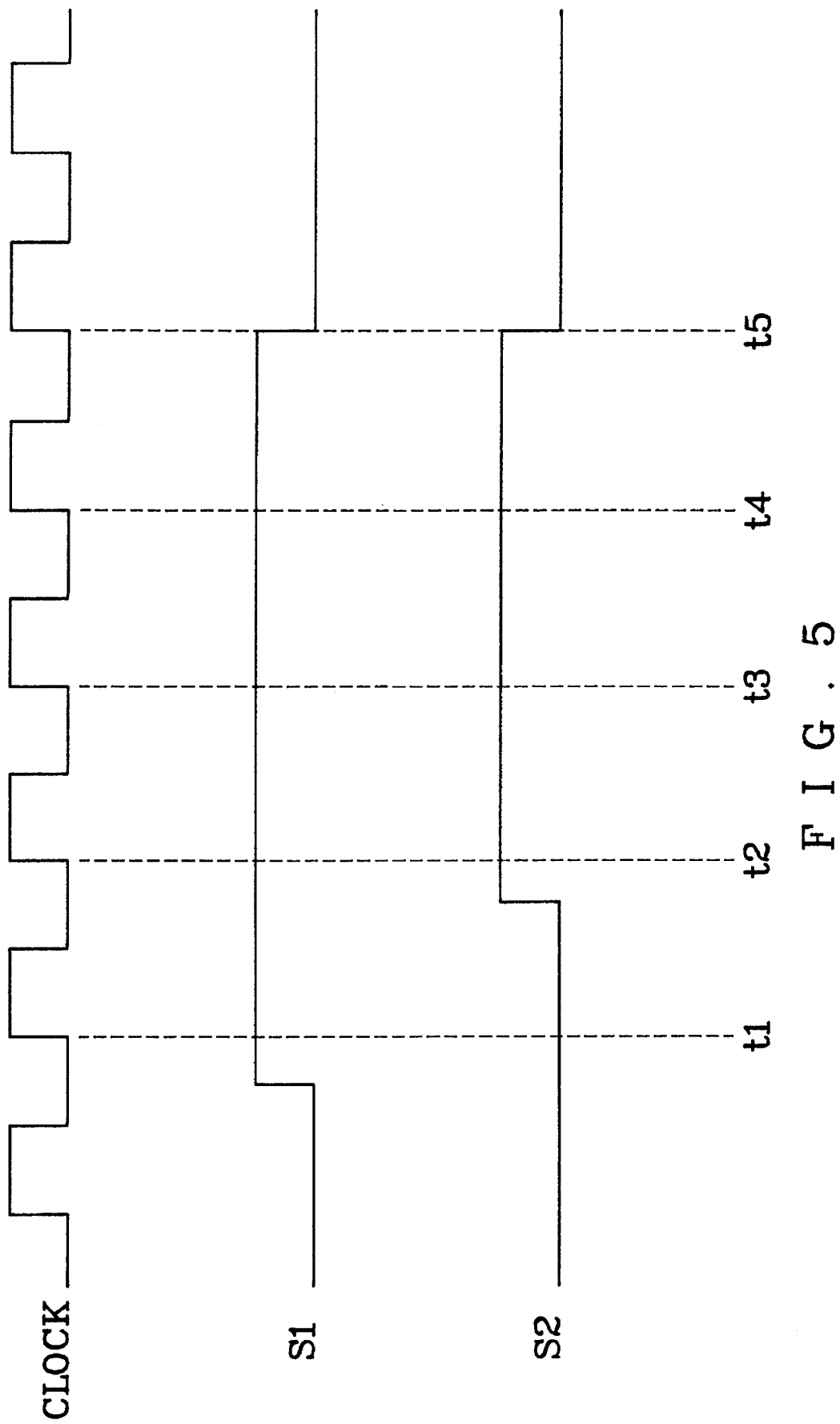
FIG. 5 is a time-sequence diagram, showing a non-synchronous condition in an embodiment according to the present invention.

For further description on the operation theory of the gate array logic circuit according to the present invention, refer to FIG. 5, which is a time-sequence diagram of an embodiment according to the present invention when a non-synchronization takes place. At the moment of t1 the gate array logic circuit has sampled and detected a non-synchronization (S1=1, and S2=0), and the gate 1 output 21 is set at "1". In that case, the clock signal of the input SG1 11 will be disabled, and the count will discontinue; then, S2 is changed to "1" at the moment of t2, and the gate 1 output 21 is reset at "0" by the gate array logic circuit to count again; and at the moment of t5, S1 and S2 are back to "0" then, the waiting procedure starts again to perform sampling detection. The reason why the gate logic circuit can restore a synchronization is that the gate 1 output 21 can disable the SG1 11 to count in case of a non-synchronization taking place during the period of S1 leading S2 (t2–t1) so as to have two (S1 and S2) signals restored to a synchronous state.

I claim:

1. A digital method for controlling digital signals so as to achieve synchronization comprising the steps of:

obtaining a gate array logic circuit for controlling a plurality of identical signal generators connected to said gate array logic circuit, said gate array containing a plurality of comparison means, each containing a comparison terminal and a reference terminal so as to cause a plurality of synchronous signals sent out from said signal generators, respectively, to be compared with each other during each clock cycle, each of said comparison terminals being connected to a signal generator whose signal is to be synchronized, and said reference terminals being respectively connected to at least two of said signal generators;

sending a clock signal which is used as an input to each respective pair of said comparison terminal and said reference terminal; wherein said gate array logic circuit further comprising an output gate, which is provided to generate a plurality of gate outputs based on a operation of said gate array logic circuit, each of said gate outputs being arranged to pass through an OR-gate so as to disable said input clock signal from one of said signal generators connected to a specific comparison terminal so as to achieve synchronization;

said operation of said gate array logic circuit comprising the following sub-steps:

(a) performing a waiting procedure for each comparison means until it is received that said comparison terminal is "1" and said reference terminal is "0", then move to a gate procedure; otherwise, continuing said waiting procedure;

(b) performing a gate procedure by continuously sending out a "1" gate signal from said comparison means, i.e., said gate being set at "1" state, until a "1" signal is received at said reference terminal is "1", then moving to a reset procedure;

(c) performing a reset procedure by sending out a "0" gate output, so as to set said gate being set at "0" state, said reset procedures continues until said reference terminal is "0", then going back to said waiting procedure;

(d) wherein a "0" gate signal indicating that system synchronization is normal, thus no disable action is taken, and a "1" gate signal indicating that one of said signal generators connected to a specific comparison reference is too fast and a disable action is taken.

2. A digital method for controlling digital signals so as to achieve synchronization as claim 1, wherein all the gate outputs of said gate array logic circuit are set in "0" state respectively at the beginning.

3. A digital method for controlling digital signals so as to achieve synchronization as claim 1, wherein:

said gate array logic circuit comprising at least three pairs of said comparison and reference terminals, and said method being used to control the synchronization of at least three signal generators;

said comparison terminals being connected to said signal generators, respectively; and all except a first of said reference terminals being connected to a common signal generator, while said first reference terminal being connected to another signal generator.

4. A digital method for controlling digital signals so as to achieve synchronization as claim 1, wherein:

said gate array logic circuit comprising three pairs of comparison and reference terminals, and said method being used to control the synchronization of three signal generators;

said three comparison terminals being connected to said three signal generators, respectively; and two of said three reference terminals being connected to a common signal generator, while one of reference terminals being connected to another signal generator.

* * * * *